July 10, 1928.

I. A. SEMENOV 1,676,361

APPARATUS FOR PRESSING TOGETHER THE EDGES OF TUBES

Original Filed Sept. 17, 1925

I. A. Semenov
inventor

By: Marks & Clark
Attys

Patented July 10, 1928.

1,676,361

UNITED STATES PATENT OFFICE.

IVAN ALEXANDROVIČ SEMENOV, OF PILSEN, CZECHOSLOVAKIA.

APPARATUS FOR PRESSING TOGETHER THE EDGES OF TUBES.

Original application filed September 17, 1925, Serial No. 57,019, and in Germany September 24, 1924. Divided and this application filed September 7, 1926. Serial No. 134,118.

This invention relates to apparatus for pressing together the edges that are to be stuck together of a continuous strip, of paper twisted together into a tube in cigarette machines, wrapping machines and the like.

In apparatus hitherto employed for the purpose stated above, the edge of the strip coated with adhesive is usually pressed upon the other edge by a metal plate which bears firmly upon the edges that are to be stuck together. The inconvenience of such a method of pressing together resides in the fact that particles of the adhesive remain clinging to the pressure applying surface, and gradually become larger and form a rough, sticky layer, which hinders the forward movement of the edges, so that the same generally tear, if the apparatus is not stopped in good time and the pressing surface cleaned. Owing to this the capacity of the apparatus is greatly reduced, while the quantity of spoilt material that has to be rejected is considerably increased.

In the apparatus according to the present invention an uninterrupted very slow movement is imparted to the pressure applying surface relatively to the edges to be stuck together, as a result of which the adhesive clinging thereto is carried forward and is cleaned off.

The accompanying drawings illustrate a constructional form of apparatus according to the present invention.

Figure 1:
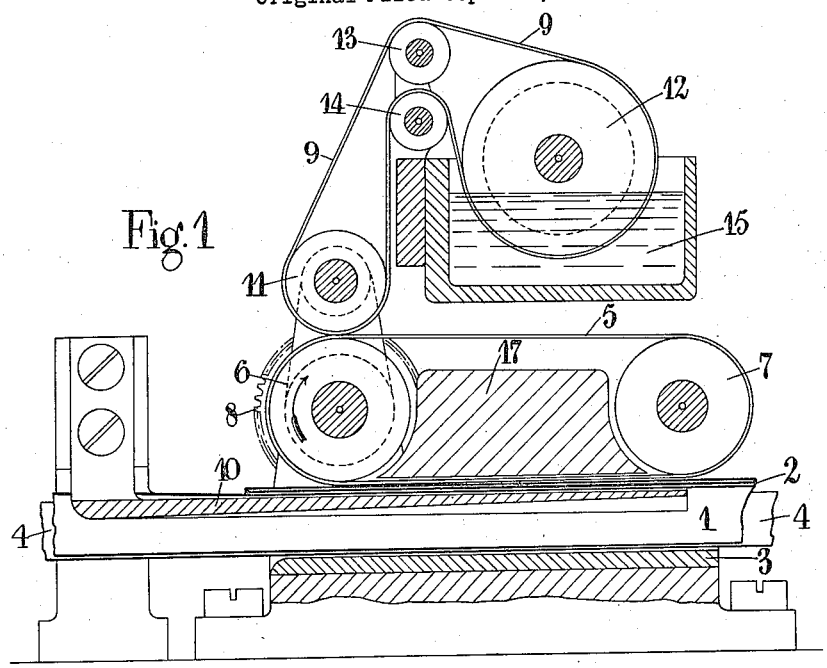
Figure 2:
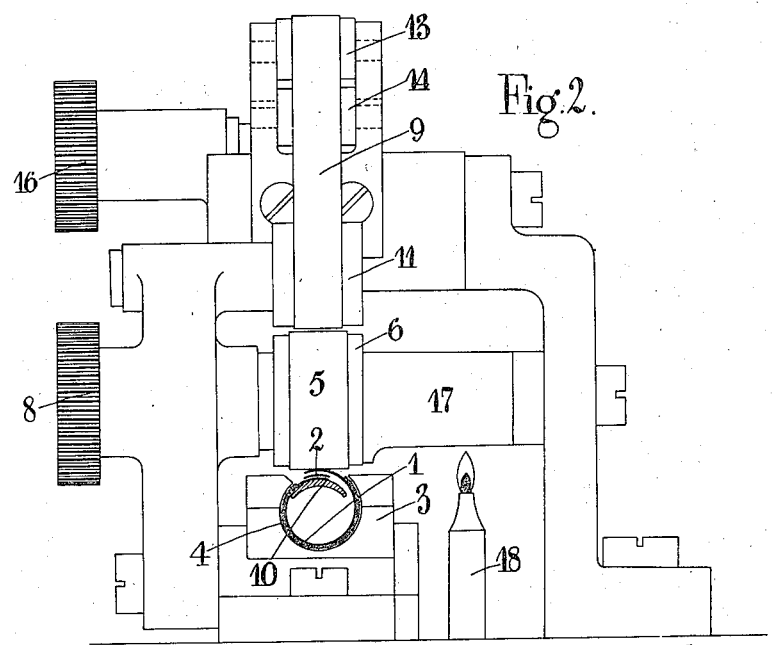

In these drawings, Figure 1 is a section of the apparatus taken along the axis of the tube to be gummed whilst Figure 2 is a side elevation thereof.

The strip 1 which is to be caused to adhere and which bears a layer of adhesive 2 upon one of its edges, moves through the shaping tube 3 in the usual way with the help of the linen band 4 surrounding the same. An endless metallic band 5, which passes around pulleys 6 and 7, to the former of which is imparted a slow rotation in the direction of the arrow by means of a toothed wheel 8, presses together the edges that are to be caused to adhere. As a support for the pressure there serves when the tube 1 is empty, a plate 10. The adhesive left clinging to the band 5 is removed by a moist band 9 which runs round pulleys 11 and 12 and rollers 13 and 14. The pulley 12, which is immersed in a water bath 15, receives its rotation by means of a toothed wheel 16. The strip 5 may be heated by a metallic piece 17 located above it, which in turn is heated either by a burner 18 or by an electric current.

What I claim is:—

Apparatus for pressing together the edges that are to be stuck together in forming an uninterruptedly moving strip of paper into a tube, comprising a movable endless band adapted to apply pressure to said edges, means for slowly moving said endless band, and a movable moist band in contact with said endless band, whereby any adhesive clinging to the said endless band is removed by the said moist band.

In testimony whereof I have signed my name to this specification.

IVAN ALEXANDROVIČ SEMENOV.